(12) United States Patent
Ogawa et al.

(10) Patent No.: US 11,225,289 B2
(45) Date of Patent: Jan. 18, 2022

(54) VEHICLE REAR PART STRUCTURE

(71) Applicant: TOYOTA JIDOSHA KABUSHIKI KAISHA, Aichi-ken (JP)

(72) Inventors: Satoshi Ogawa, Toyota (JP); Tsukasa Masuyama, Kariya (JP); Yasunori Sasaki, Kariya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 147 days.

(21) Appl. No.: 16/597,868

(22) Filed: Oct. 10, 2019

(65) Prior Publication Data

US 2020/0114975 A1    Apr. 16, 2020

(30) Foreign Application Priority Data

Oct. 15, 2018  (JP) .............................. JP2018-194641

(51) Int. Cl.
*B62D 25/08* (2006.01)
*B60J 7/20* (2006.01)
*B62D 21/02* (2006.01)

(52) U.S. Cl.
CPC .............. *B62D 25/088* (2013.01); *B60J 7/20* (2013.01); *B62D 21/02* (2013.01)

(58) Field of Classification Search
CPC ...... B62D 25/088; B62D 21/02; B62D 25/08; B62D 25/20; B60J 7/20
USPC .......................... 296/204, 203.04, 30, 107.08
See application file for complete search history.

(56) References Cited

U.S. PATENT DOCUMENTS

| | | | | |
|---|---|---|---|---|
| 4,950,025 A | * | 8/1990 | Yoshii | B62D 25/04 296/203.04 |
| 5,788,322 A | * | 8/1998 | Wolf | B62D 25/088 296/181.4 |
| 6,443,518 B1 | * | 9/2002 | Rohl | B62D 25/082 296/187.12 |
| 7,481,476 B2 | * | 1/2009 | Heiss | B60R 21/13 280/756 |
| 7,614,686 B2 | * | 11/2009 | Robertson | B60J 7/04 296/187.12 |

(Continued)

FOREIGN PATENT DOCUMENTS

| | | |
|---|---|---|
| CN | 1453178 A | 11/2003 |
| JP | 2003-137137 A | 5/2003 |
| JP | 2013-163470 A | 8/2013 |

*Primary Examiner* — D Glenn Dayoan
*Assistant Examiner* — E Turner Hicks
(74) *Attorney, Agent, or Firm* — Hauptman Ham, LLP (57) ABSTRACT

The present vehicle rear part structure includes: a rear cross member that extends in a vehicle width direction on a bottom of a vehicle, and is coupled to structural materials of both side parts of the vehicle; under braces that extend in the vehicle width direction, and couple the rear cross member, and the structural materials of both side parts of the vehicle; a pair of rear suspension towers that are provided in the both side parts of the vehicle, and support the pair of rear suspensions; and a room partition, having both ends in the vehicle width direction connected to the pair of rear suspension towers, and having an intermediate lower end in the vehicle width direction coupled to the rear cross member from an upper side. Coupling positions of the under braces and the rear cross member are below a coupling position of the room partition and the rear cross member.

11 Claims, 6 Drawing Sheets

(56) References Cited

U.S. PATENT DOCUMENTS

| | | | | |
|---|---|---|---|---|
| 7,766,416 B2* | 8/2010 | McClure | ................ | B62D 33/00 |
| | | | | 296/182.1 |
| 7,806,467 B2* | 10/2010 | Sangu | ................ | B62D 25/2045 |
| | | | | 296/203.04 |
| 9,004,579 B2* | 4/2015 | Kim | ................ | B62D 25/087 |
| | | | | 296/193.02 |
| 9,868,474 B2* | 1/2018 | Shin | ................ | B62D 25/2027 |
| 2003/0102696 A1* | 6/2003 | Matsuoka | ............ | B62D 25/087 |
| | | | | 296/203.04 |
| 2013/0049394 A1* | 2/2013 | Urano | ................ | B62D 43/08 |
| | | | | 296/37.2 |

\* cited by examiner

VEHICLE REAR PART STRUCTURE

CROSS REFERENCE TO RELATED APPLICATION

This application claims priority to Japanese Patent Application No. 2018-194641 filed on Oct. 15, 2018, which is incorporated herein by reference in its entirety including the specification, claims, drawings, and abstract.

TECHNICAL FIELD

The present disclosure relates to a vehicle rear part structure, and more particular to a structure of load transmission in a vehicle rear part.

BACKGROUND

In a vehicle rear part, various reinforcing members are used in order to maintain rigidity in the vehicle width direction. For example, JP 2003-137137 A discloses a structure in which a rear cross member that extends in the vehicle width direction at a lower part of a rear floor, a package cross member that extends in the vehicle width direction above the rear cross member, and a V-shaped gusset that connects both ends of the package cross member and an upper part of the center in the vehicle width direction of the rear cross member, are provided.

Herein, in consideration of load transmission from rear wheels, a more effective load transmission structure is desired.

SUMMARY

A vehicle rear part structure according to the present disclosure includes: a rear cross member that extends in a vehicle width direction on a bottom of a vehicle, and is coupled to structural materials of both side parts of the vehicle; under braces that extend in the vehicle width direction, and couple the rear cross member, and the structural materials of the both side parts of the vehicle; a pair of rear suspension towers that are provided in the both side parts of the vehicle, and support a pair of rear suspensions; and a room partition, having both ends in the vehicle width direction connected to the pair of rear suspension towers, and having an intermediate lower end in the vehicle width direction coupled to the rear cross member from an upper side, wherein coupling positions of the under braces and the rear cross member may be below a coupling position of the room partition and the rear cross member.

An upper end of the room partition may have a downward arch shape.

The room partition may be coupled to the rear cross member through a center member fixed to an upper surface of the rear cross member.

The under braces may be coupled to the rear cross member through a bracket fixed to a lower surface of the rear cross member.

The room partition may include a first panel located on a front side, and a second panel joined to the first panel from a rear side, and further, a closed sectional part that bulges in such a direction that the first and second panels are separated, and forms an internal space, may exist in a joining portion of the first and second panels.

The vehicle rear part structure may have a storage space that stores a roof, in front of the room partition.

According to the present disclosure, loads applied through the rear suspension towers are transmitted to the under braces by using the room partition, and sufficient body strength can be obtained.

BRIEF DESCRIPTION OF DRAWINGS

An embodiment of the present disclosure will be described based on the following figures, wherein.

DESCRIPTION OF EMBODIMENTS

Hereinafter, an embodiment of the present disclosure will be described with reference to the drawings. The present disclosure is not limited to the embodiment described herein.

"Overall Structure"

Figure 1:
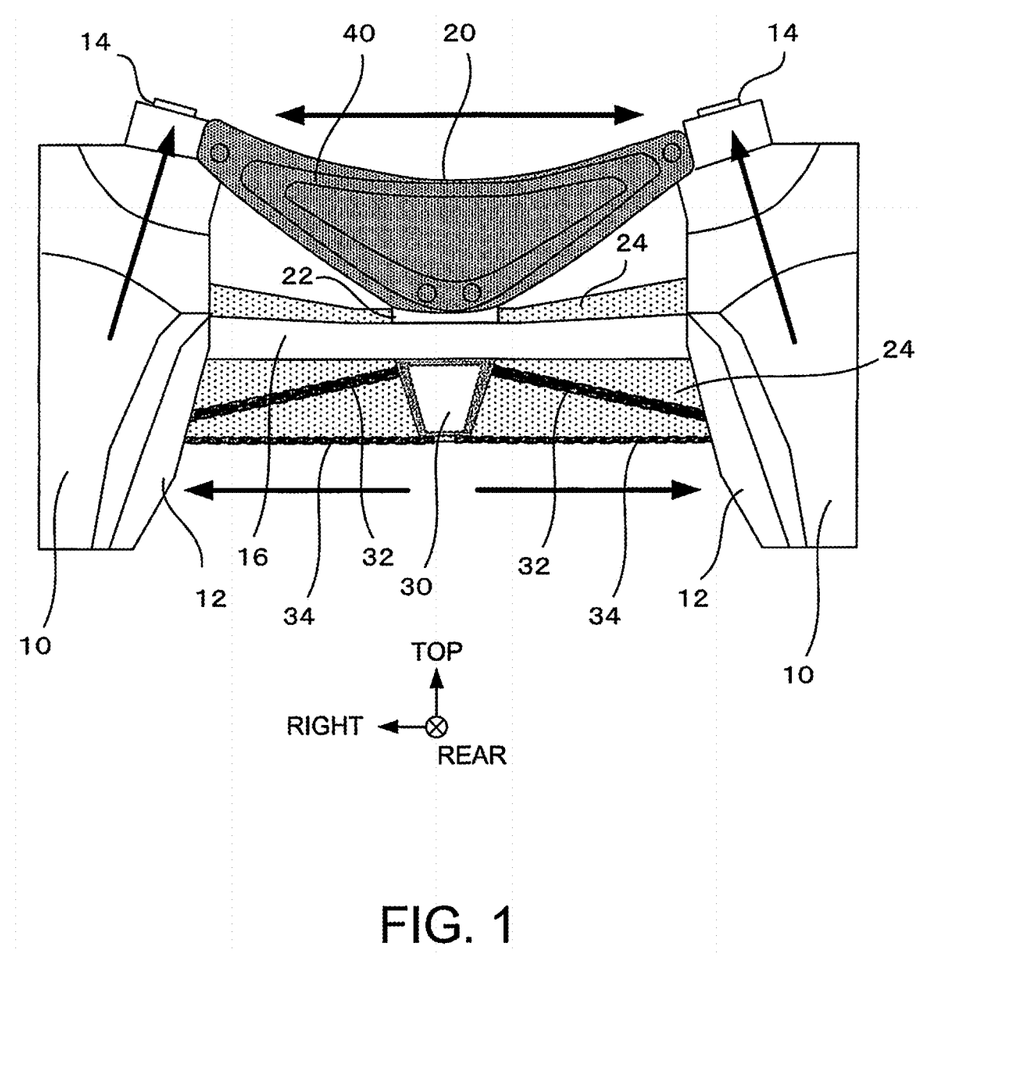
FIG. 1 is a schematic diagram illustrating a vehicle rear part structure according to an embodiment.

FIG. 1 is a schematic diagram illustrating a vehicle rear part structure according to the embodiment, and a state before a seat and the like are disposed is viewed from a vehicle front side.

Side part structures 10 are disposed as side walls on a vehicle interior side, on both sides of the vehicle rear part. A body panel and the like are located outside these side part structures 10. Additionally, side members 12 that extend in the longitudinal direction are provided inside lower parts of the side part structures 10 on both sides. The side members 12 are each a structural material (frame material) of the vehicle, and are cylindrical members having a rectangular cross-section.

Hollow cylindrical rear suspension towers (suspension towers) 14 that extend upward from the respective side part structures 10 are provided at positions corresponding to the rear wheels outside the side part structures on the both sides. The suspension towers 14 support respective rear suspensions on lower sides of upper ends thereof. The rear suspensions suspend axles, and loads applied to the rear wheels are transmitted to the suspension towers 14 through the rear suspensions.

A rear cross member 16 extending in the vehicle width direction is provided below positions corresponding to the suspension towers 14 in the vehicle longitudinal direction. This rear cross member 16 is also a vehicle structural material, and is a cylindrical member having a rectangular cross-section, similarly to the side members 12. Both ends of the rear cross member 16 are connected to inner side walls of the side members 12.

Both ends of the room partition 20 having a laterally long triangle facing downward as viewed from the front are connected to the suspension towers 14 on the both sides directly or through the side part structures 10 disposed in the vicinity thereof. For example, brackets or the like may be provided on the suspension tower 14 sides, and fixing may be attained through the brackets or the like by fastening bolts. An intermediate lower end in the vicinity of the center of the room partition 20 is connected to an upper surface of the rear cross member 16 through a center member 22. Connection of the room partition 20 and the center member 22 is performed by, for example, fastening bolts. The center member 22 is a member extending in the vehicle width direction, a cross-section of the center member is a trapezoidal member having a widening lower side, and a rear surface of a lower end of the room partition 20 is connected to a front surface of the center member. The length in the vehicle width direction of the center member 22 only needs to be long enough to be connected to the lower end of the room partition 20, and is located only in the vicinity of the center of the vehicle. Additionally, ribs are formed in front and rear parts of a lower end of the center member 22, and are fixed to the upper surface of the rear cross member 16. This fixing is performed by, for example, welding.

Thus, the center member 22 is provided so that the lower end of the room partition 20 can be fixed to the rear cross member 16 with sufficient strength.

Furthermore, a floor panel 24 is provided at a vehicle interior bottom. The floor panel 24 may be located between the center member 22 and the upper surface of the rear cross member 16. In FIG. 1, the floor panel 24 is illustrated as a member extending from the rear side to the front side, and is illustrated so as to cover the front of a member below the rear cross member 16.

Figure 7:
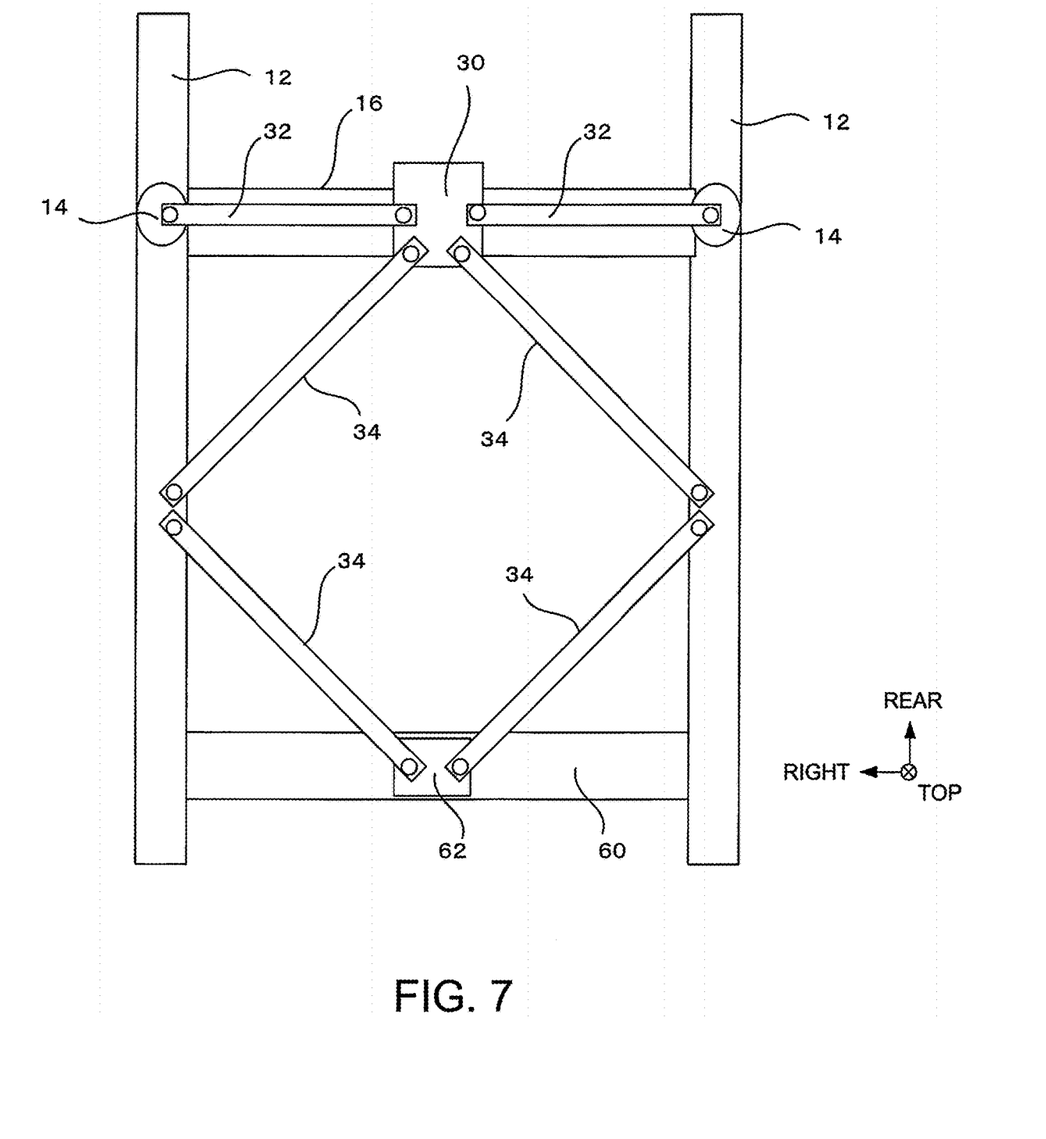
FIG. 7 is a diagram of under braces 32, 34 as viewed from the lower side.

As illustrated in FIG. 7, a bracket 30 for under brace mounting is fixed to a lower surface of the rear cross member 16. For example, mounting is performed by bolt fastening.

A pair of under braces 32 directed laterally are connected to both side surfaces in the vehicle width direction of this bracket 30. The pair of under braces 32 directed laterally extend laterally below the rear cross member 16, and are connected to lower surfaces of the side members 12.

A pair of under braces 34 directed obliquely laterally are connected to a lower surface of the bracket 30, and the other ends of these under braces 34 directed obliquely laterally are connected to the lower surfaces of the front side members 12.

Thus, the bracket 30 is provided so that the under braces 32, 34 can be fixed to the rear cross member 16 with sufficient strength.

With such a rear part structure, as illustrated by the arrow in FIG. 1, loads from the wheels are transmitted from the suspension towers 14 to the room partition 20, and the room partition 20 transmits the loads to the suspension towers 14 on the other sides. Therefore, the loads from both the right and left wheels are mutually transmitted to the other sides by the room partition 20, so that the loads are transmitted by both the wheels. Additionally, the bracket 30 is located below a connection part of the lower end of the room partition 20, so that the loads that act downward from room partition 20 are transmitted to the suspension towers 14 through the under braces 32, and the side part structures 10. With such a structure, rigidity of a vehicle body can be improved. Furthermore, the room partition 20 has a structure in which an upper end has an arch shape recessed downward. Therefore, loads applied from both the right and left sides can be received, and it is possible to reduce loads to be applied to coupling bolts in both ends.

"Configuration of Room Partition 20"

Figure 2:
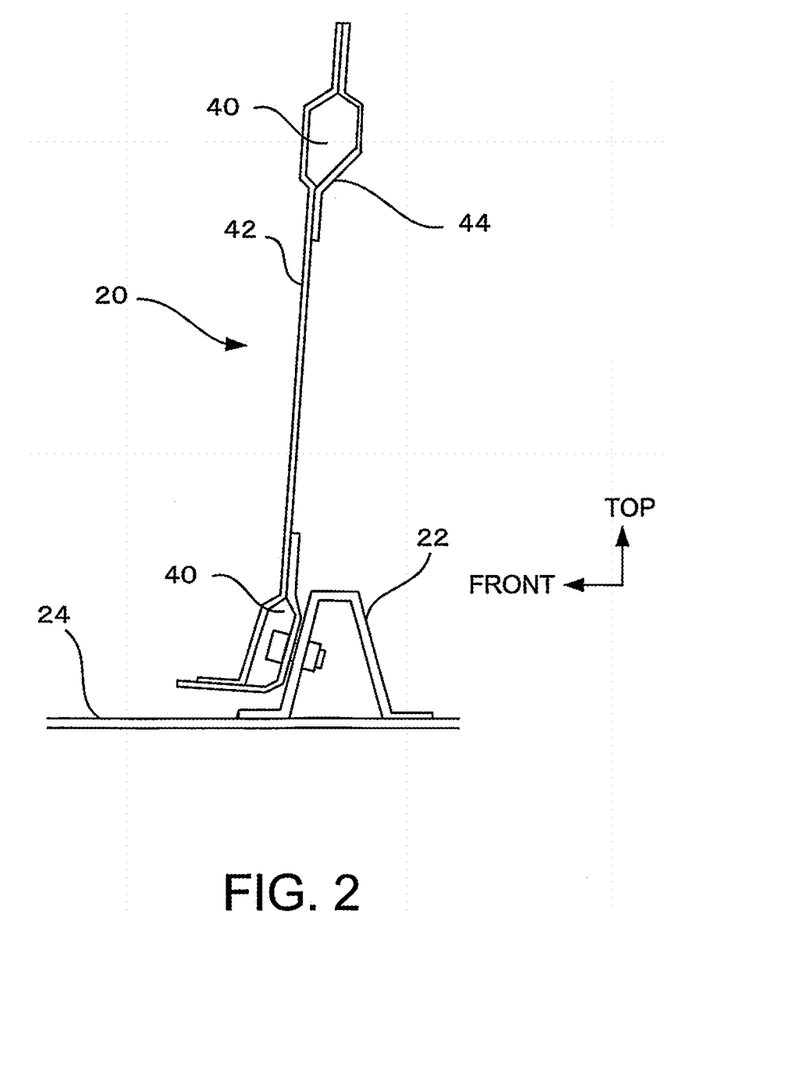
FIG. 2 is a longitudinal sectional view of the vicinity of the center of a room partition 20 on a surface facing in the longitudinal direction of a vehicle.

Herein, the room partition 20 illustrated in FIG. 2 has a triangular annular closed sectional part 40 along a peripheral part thereof. That is, the room partition 20 has a region that has a front surface side panel and rear surface side panel so as to have a rectangular cross-section.

Thus, the annular closed sectional part 40 is provided in the room partition 20, so that sufficient strength can be provided in the room partition 20, and it is possible to sufficiently withstand loads from the suspension towers 14.

FIG. 2 is a longitudinal sectional view of the vicinity of the center of the room partition 20 on a surface facing in the longitudinal direction of the vehicle. Thus, the room partition 20 is configured such that a first panel 42 on the front surface side and a second panel 44 on the rear surface side are bonded (joined) to each other. In a peripheral region of the room partition 20, the first panel 42 bulges forward, and the second panel 44 bulges rearward, so that the closed sectional part 40 including an internal space is formed between both of the panels. In this example, the second panel 44 is a triangular annular panel member having a hollow inside region as viewed from the longitudinal direction.

A rear wall of a lower end of the closed sectional part 40 is fixed to the center member 22 by bolts. The center member 22 is fixed to the floor panel 24 by welding or the like. In this example, the closed sectional part 40 is fastened to the center member 22 by bolts. Therefore, a front surface of the closed sectional part 40 may be provided with openings so as to enable access to the bolts. Additionally, bolt fastening portions on the right and left of the room partition 20 may be similarly disposed in the closed sectional part 40, or all the bolt fastening portions may be disposed outside the closed sectional part 40.

"Coupling Structure"

Figure 3:
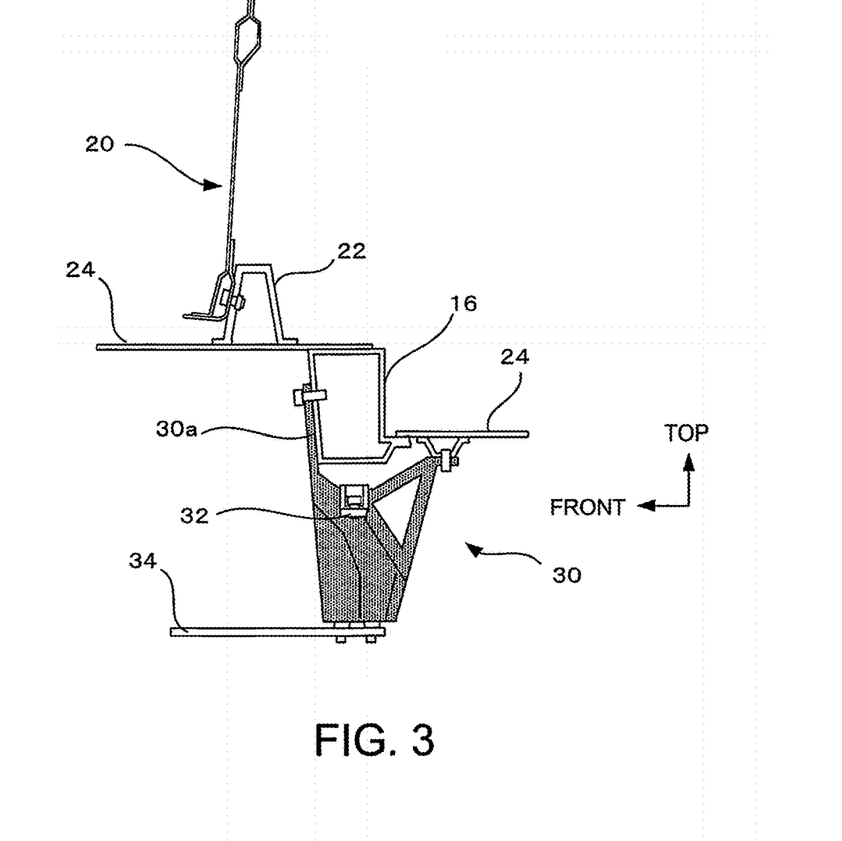
FIG. 3 is a diagram illustrating a structure of a lower side of FIG. 2.

FIG. 3 illustrates a structure of a lower side of FIG. 2. Thus, the rear cross member 16 is fixed to a lower surface of the floor panel 24. The bracket 30 is provided so as to be fixed to a front surface of the rear cross member, and the lower surface of the floor panel 24 behind the rear cross member 16.

Figure 4:
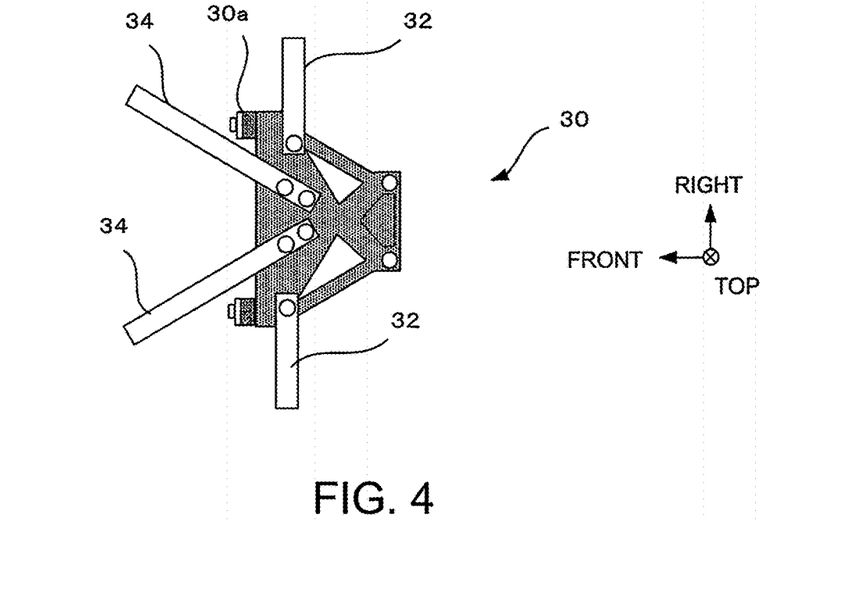
FIG. 4 is a diagram of a bracket 30 as viewed from a lower side.

FIG. 4 is a diagram of the bracket 30 as viewed from the lower side. Thus, the under braces 32 that extend laterally are fastened at positions near the floor panel 24 of the bracket 30 by bolts, and the under braces 34 that extend obliquely laterally are fastened to a lower end top surface of the bracket 30 by bolts. Leg parts 30*a* that extend upward are fastened to the rear cross member 16 of the bracket 30 by bolts.

Thus, coupling positions of the rear cross member 16 and the under braces 32, 34 exist below a coupling position of the room partition 20 and the rear cross member 16.

"Configuration of Upper Side"

Figure 5:
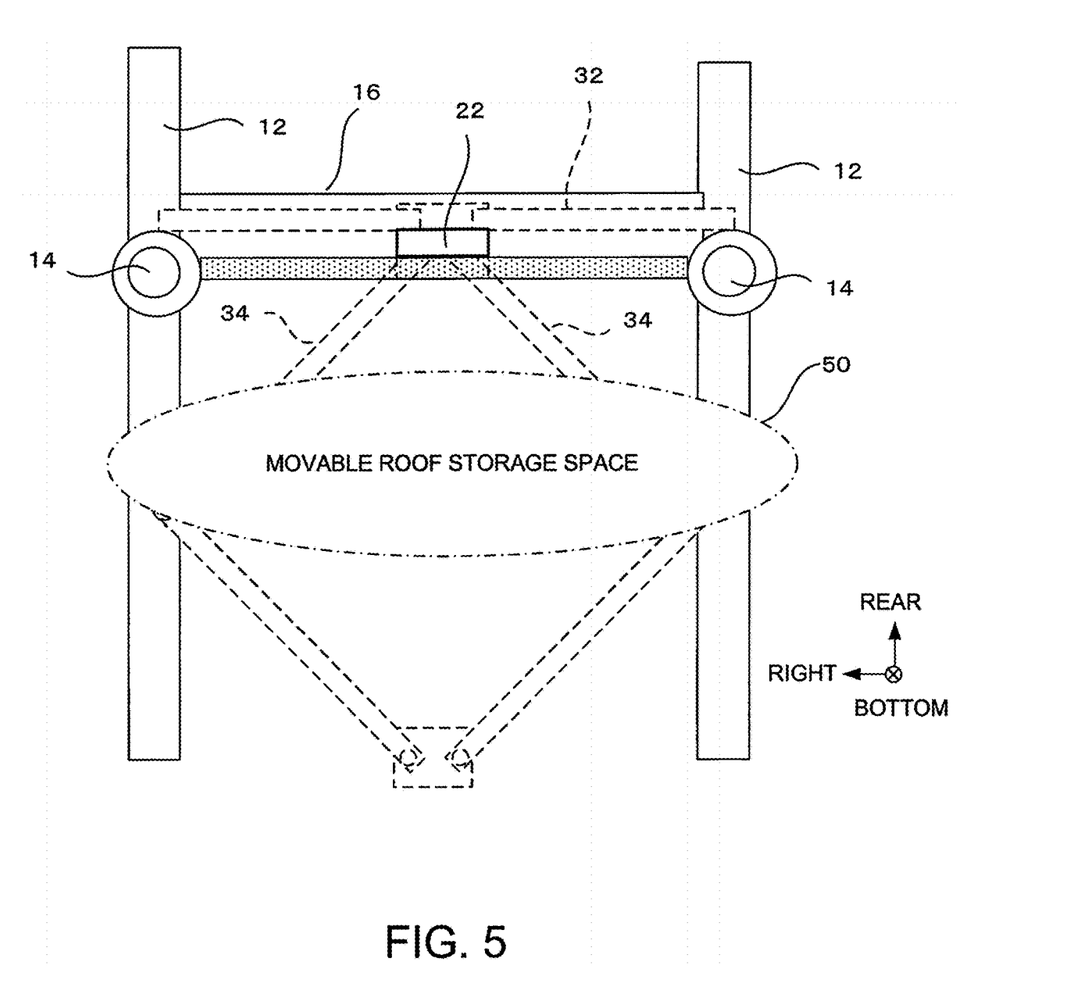
FIG. 5 is a schematic diagram of a rear part structure as viewed from an upper side.
Figure 6:
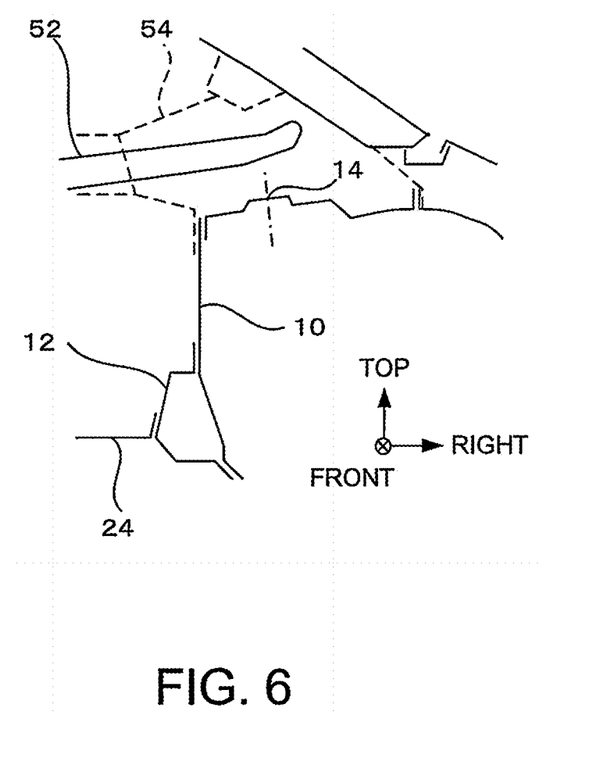
FIG. 6 is a transverse sectional view of a vehicle side part in the vicinity of a suspension tower 14, cut along a surface in the vehicle width direction.

FIG. 5 is a schematic diagram of the aforementioned rear part structure as viewed from the upper side. Thus, a movable roof storage space 50 is formed on a front upper side of the room partition 20. FIG. 6 is a transverse sectional view of a vehicle side part in the vicinity of the suspension tower 14, cut along a surface in the vehicle width direction. Thus, a movable roof 52 extends up to a lateral side. Thus, in a case in which the movable roof 52 is provided, a body frame material 54 that would be provided in a vehicle including no movable roof, and illustrated by a broken line in the drawing, cannot be provided.

According to this embodiment, the frame structure using the aforementioned room partition 20 is provided, so that it is possible to obtain sufficient rigidity of the vehicle body.

"Configuration of Lower Side"

FIG. 7 is a diagram of the under braces 32, 34 as viewed from the lower side. Thus, the four under braces 34 constitute a square. That is, the two under braces 34 on the rear side extend obliquely forward from the bracket 30, and are fastened to the lower surfaces of the side members 12 by bolts, and the two under braces 34 extend obliquely inner forward from the above places. These two under braces 34 are fastened to a bracket 62 provided on a lower surface of a front cross member 60 by bolts.

With such a configuration, it is possible to obtain sufficient rigidity of the lower part of the vehicle.

The invention claimed is:

1. A vehicle rear part structure comprising:
   a rear cross member that extends in a vehicle width direction on a bottom of a vehicle, and is coupled to structural materials of both side parts of the vehicle;
   under braces that extend in the vehicle width direction, and couple the rear cross member and the structural materials of both side parts of the vehicle, below the rear cross member, and the each of the under braces is connected to the rear cross member;
   a pair of rear suspension towers that are provided in both side parts of the vehicle, and support a pair of rear suspensions; and
   a room partition, having both ends in the vehicle width direction connected to the pair of rear suspension towers, having an intermediate lower end in the vehicle width direction coupled to the rear cross member, having a triangular shape when viewed from a vehicle front-back direction, the room partition comprises vertices correspondingly connected to the pair of rear suspension towers, and the room partition has a middle lower apex connected to an upper side of the rear cross member,
   wherein coupling positions of the under braces and the rear cross member are below a coupling position of the room partition and the rear cross member.

2. The vehicle rear part structure according to claim 1, wherein
   an upper end of the room partition has a downward arch shape.

3. The vehicle rear part structure according to claim 1, wherein
   the room partition is coupled to the rear cross member through a center member fixed to an upper surface of the rear cross member.

4. The vehicle rear part structure according to claim 2, wherein
   the room partition is coupled to the rear cross member through a center member fixed to an upper surface of the rear cross member.

5. The vehicle rear part structure according to claim 1, wherein
   the under braces are coupled to the rear cross member through a bracket fixed to a lower surface of the rear cross member.

6. The vehicle rear part structure according to claim 2, wherein
   the under braces are coupled to the rear cross member through a bracket fixed to a lower surface of the rear cross member.

7. The vehicle rear part structure according to claim 3, wherein
   the under braces are coupled to the rear cross member through a bracket fixed to a lower surface of the rear cross member.

8. The vehicle rear part structure according to claim 4, wherein
   the under braces are coupled to the rear cross member through a bracket fixed to a lower surface of the rear cross member.

9. The vehicle rear part structure according to claim 1, wherein
   the room partition includes a first panel located on a front side, and a second panel joined to the first panel from a rear side, and
   a closed sectional part that bulges in such a direction that the first and second panels are separated, and forms an internal space that exists in a joining portion of the first and second panels.

10. The vehicle rear part structure according to claim 1, comprising
    a storage space that stores a roof, in front of the room partition.

11. A vehicle rear part structure comprising:
    a plurality of side parts;
    a rear cross member extending in a vehicle width direction and is coupled to structural materials of each of the plurality of side parts;
    under braces extending in the vehicle width direction, wherein each of the under braces couples the rear cross member and a corresponding side part of the plurality of side parts, each of the under braces is below the rear cross member;
    a pair of rear suspension towers, wherein each of the pair of rear suspension towers is on a corresponding side of the vehicle;
    a pair of rear suspensions, wherein each of the pair of rear suspensions is supported by a corresponding rear suspension tower of the pair of rear suspension towers; and
    a room partition connected to each of the pair of rear suspension towers, wherein the room partition comprises:
       an intermediate lower end in the vehicle width direction coupled to the rear cross member from an upper side of the rear cross member,
       a triangular shape when viewed in a vehicle length direction perpendicular to the vehicle width direction,
       vertices, wherein each of the vertices is respectively connected to a corresponding one of the rear suspension towers,
    wherein coupling positions of the under braces and the rear cross member are below a coupling position of the room partition and the rear cross member.

* * * * *